United States Patent

Schedler et al.

[11] Patent Number: 5,941,073
[45] Date of Patent: Aug. 24, 1999

[54] METHOD FOR ADSORPTIVE WASTE GAS CLEANING

[76] Inventors: Johannes Schedler, Mittergrabenweg 72, Graz, Australia, A-8010; Heimo Thalhammer, Josef-Posch-Strasse 123, Graz, Australia, A-8052

[21] Appl. No.: 09/060,968

[22] Filed: Apr. 15, 1998

[30] Foreign Application Priority Data

Apr. 22, 1997 [DE] Germany ............................ 197 16 877

[51] Int. Cl.⁶ ...................................................... F01B 31/06
[52] U.S. Cl. ................................................ 60/687; 60/694
[58] Field of Search ............................... 60/685, 687, 694

[56] References Cited

U.S. PATENT DOCUMENTS

| | | | |
|---|---|---|---|
| 3,312,447 | 4/1967 | Bellati et al. .......................... | 60/687 X |
| 5,020,589 | 6/1991 | Viscovich et al. ..................... | 60/690 X |
| 5,297,954 | 3/1994 | Colagiovanni .......................... | 431/5 |

*Primary Examiner*—Hoang Nguyen
*Attorney, Agent, or Firm*—Flynn, Thiel, Boutell & Tanis, P.C.

[57] ABSTRACT

For cleaning waste air loaded with organic pollutants one uses an adsorptive cleaning plant with a rotating cylindrical body containing an adsorbent through which waste air to be cleaned is passed for adsorption of the pollutants, hot air for desorption of the adsorbed pollutants and cooling air for cooling the desorption zone. Waste air with desorbed pollutants is supplied to an afterburning plant with a firebox. The hot air is formed by mixture of a part of the firebox air heated to 700 to 900° C. produced in the firebox, with the heated cooling air passing out of the cylindrical body. The afterburning plant has two chambers connected via the firebox and filled with a heat-retaining packing, waste air with desorbed pollutants being supplied alternatingly to one of the chambers and clean air removed from the other chamber.

16 Claims, 3 Drawing Sheets

METHOD FOR ADSORPTIVE WASTE GAS CLEANING

This invention relates to a method for cleaning waste air loaded with organic pollutants according to the preamble of claim 1. It also relates to a plant for carrying out this method.

Such a method and plant are known from WO95/01827. In one embodiment of the known plant, the waste air with the desorbed pollutants is supplied to the afterburning plant via a heat exchanger heated by the firebox air. The firebox air is thus cooled before being mixed with the heated cooling air passing out of the cylindrical body to form the hot air. In another embodiment of the known plant with a regenerative afterburning plant, the clean gas passing out of the afterburning plant is mixed with the heated cooling air passing out of the cylindrical body to form the hot air.

In the known plant, the hot air is thus circulated between the cylindrical body and the particular afterburning plant. That is, the main part of the moisture expelled from the adsorbent of the cylindrical body with the hot desorption air is afterburned but then recycled to the cylindrical body as hot desorption air, causing the moisture content to accumulate increasingly and resulting in worse adsorption and corrosion due to failure to exceed the dew point.

In the known plant, the waste air to be cleaned is therefore cooled with a cooling device before being supplied to the cylindrical body. For the cooled waste air to be heated back to a temperature suitable for adsorption, part of the air heated in the heat exchanger or the heated clean air passing out of the afterburning chamber is supplied to it before it enters the cylindrical body. In the embodiment with the heat exchanger, the total thermal energy demand of the known plant is about 150 kW per 10,000 Nm$^3$/h waste gas to be cleaned. For the cooling effect to suffice, the cooling air stream must reach approximately the same throughput as the hot desorption stream. With a zeolite as an adsorbent, the hot desorption air must be heated to at least 160° C. In order to heat the cooling air from 50° C. to 160° C. in the embodiment of the known plant with the afterburning chamber, however, one would have to admix 75% air component at 206° C. from the afterburning chamber. Such a high hot air component is not available in this embodiment. But the embodiment of the known plant with the heat exchanger also requires a much greater component of hot air than cooling air and thus a disadvantageous mixture ratio for practical working.

In such a cleaning plant, polluted waste gas flows through more than half the cross section of the cylindrical body containing adsorbent, while the hot air for desorbing absorbed pollutants flows into a smaller segment. The rotation of the cylindrical body and the sector-shaped connections for supplying and removing the individual gases to and from the body relative to each other permits continuous operation. That is, the cylindrical body of the cleaning plant can rotate while the sector-shaped connections do not move, or the connections can rotate while the cylindrical body is fixed, as described e.g. in DE 43 15 578 A1.

Further, so-called regenerative thermal afterburning plants are known wherein the waste air with organic pollutants is supplied alternatingly to at least two chambers filled with heat-retaining packing and connected via a firebox. Due to the heat-retaining packing of the chamber which has been heated in the prior cycle, the waste air to be cleaned is preheated before entering the firebox (DE 29 51 525 A1, EP 0 472 605 B1). If they have a low concentration in the waste air to be cleaned, the organic pollutants can be concentrated with an absorbent and subsequent desorption before being supplied to the regenerative thermal afterburning plant (U.S. Pat. No. 5,297,954).

The problem of the invention is to essentially reduce the total energy demand of such a plant without impairing the high cleaning efficiency and without increasing the equipment expense.

This is obtained according to the invention with the method characterized in claim 1 and the plant characterized in claim 8. The subclaims state advantageous embodiments of the method and plant.

According to the invention, waste air with desorbed pollutants is supplied to an afterburning plant having two chambers connected via the firebox and filled with a heat-retaining packing, the waste air with desorbed pollutants being supplied alternatingly to one chamber while clean air is removed from the other chamber. Part of the firebox air having a temperature of 700° C. to 900° C., in particular about 800° C., is removed from the firebox of the afterburning plant and mixed directly with the heated cooling air to form the hot air for desorbing pollutants adsorbed in the cylindrical body.

Most of the firebox air thus leaves the afterburning plant as low-temperature clean gas. The mixture ratio of heated cooling air to firebox air heated to 700° C. to 900° C. is preferably between 3 and 10 parts by weight cooling air, preferably 4 to 6 parts by weight cooling air, per 1 part by weight firebox air heated to 700° C. to 900° C. That is, the partial stream of firebox air removed from the firebox to form the hot gas is ⅓ to ¹⁄₁₀, preferably ¼ to ⅙, of the total firebox air of the afterburning plant. Thus, ⅔ to ⁹⁄₁₀ or preferably ¾ to ⅚ of the firebox air in the afterburning plant is used for heating the heat-retaining packing before leaving the afterburning plant as clean air cooled to less than 100° C. The energy consumption of the total plant is thus reduced according to the invention by about 60% over the conventional plant. A partial stream of preferably 5% to 20% is diverted from the waste air loaded with organic pollutants to be cleaned as cooling air for cooling the just desorbed sector of the cylindrical body. That is, the throughput of waste air with desorbed pollutants in the afterburning plant is 5 to 20 wt % of the throughput of waste air to be cleaned passing through the cylindrical body.

The adsorptive cleaning plant used according to the invention can be a conventional adsorptive cleaning plant with such a cylindrical body filled with adsorbent, whereby the connections for admitting and discharging the gases, on the one hand, and the body, on the other hand, rotate relative to each other.

The cylindrical body preferably has air-permeable end walls on each side and a plurality of radially extending partitions between the two end walls, and the connections for admitting waste air to be cleaned and for discharging clean air, for admitting hot air and for discharging waste air with desorbed pollutants and for passing cooling air through the cylindrical body are formed as segments of a circle which are disposed on the end walls concentric to the rotational axis. The connections for admitting waste air to be cleaned and for discharging clean air, for admitting hot air and for discharging waste air with desorbed pollutants and for passing cooling air are located exactly opposite each other on each side of the cylindrical body. The connections for admitting waste air to be cleaned and for admitting cooling air and for discharging waste air with desorbed pollutants are located on one side of the cylindrical body and the connections for discharging clean air, for admitting hot air and for discharging heated cooling air are disposed on the other side of the cylindrical body.

The afterburning plant used according to the invention is preferably formed in accordance with German patent application 196 43 821.7, to which reference is made in all points.

When waste air with desorbed pollutants is supplied to one chamber of the afterburning plant while clean air is removed from the other chamber, and the chambers are changed in order to supply waste air with desorbed pollutants and remove clean gas to and from the other chamber in each case, the chamber to which waste air with desorbed pollutants was supplied is filled with this waste air which then flows into the clean gas pipe when the latter is connected to this chamber. Thus, at least one chamber filling of waste air with desorbed pollutants would flow into the clean gas pipe.

In order to prevent this, heated cooling air is supplied according to the invention to the chamber to which waste air with desorbed pollutants was supplied before clean air is removed therefrom. Heated cooling air thus displaces pollutants from this chamber into the firebox, where they are burned. When the chamber is connected to the clean gas pipe and the direction of flow in the afterburning plant reversed, only some cooling air, i.e. some of the waste air to be cleaned which is much less loaded with pollutants, passes into the clean gas pipe at each change of flow. The chambers are preferably rinsed with cooling air for no longer than 5 seconds.

For rinsing the chambers with cooling air, the pollutant supply pipe in which waste air with desorbed pollutants flows to the afterburning plant is connected via a bypass pipe with the hot gas supply pipe supplying hot gas to the cylindrical body, suitable shut-off devices being provided for blocking the supply of waste air with desorbed pollutants from the cylindrical body and for supplying hot gas from the hot gas supply pipe.

In order to keep pressure relations constant on the cylindrical body, a separate fan is preferably provided for sucking cooling air out of the cylindrical body.

The adsorbent filling the cylindrical body is preferably a hydrophobic zeolite. A mixture of zeolite, in particular a hydrophobic zeolite, with active carbon has also proven suitable. The hydrophobic zeolite typically consists of 90 to 97 wt % $SiO_2$, 2 to 10 wt % $Al_2O_3$ and <1% Na. If a mixture of zeolite and active carbon is used, the mixture ratio is preferably 50 to 90 wt % zeolite and 10 to 50 wt % active carbon.

In the following an embodiment of the inventive plant will be explained in more detail with reference to the drawing, in which.

Figure 1:
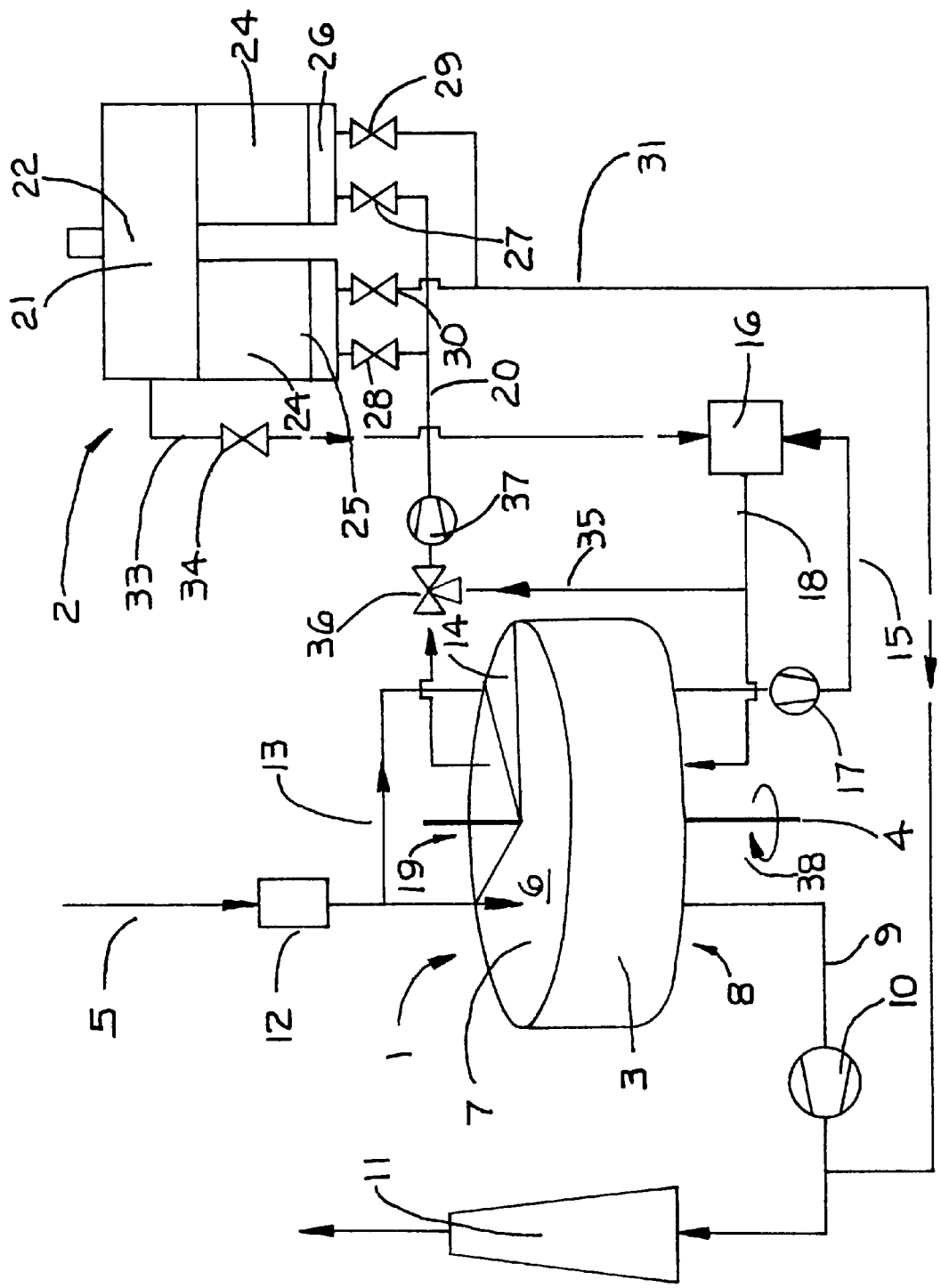
FIG. 1 shows a schematic view of the total plant.

According to FIG. 1 the plant consists of adsorptive cleaning plant 1 and afterburning plant 2.

Adsorptive cleaning plant 1 has cylindrical body 3 which is filled with an adsorbent and set rotating about axle 4 of a motor not shown.

Cylindrical body 3 is supplied waste air to be cleaned via polluted gas pipe 5. For this purpose a connection (not shown) is provided which is formed like a segment of a circle corresponding to adsorption zone 6, the edge area of the connection being sealed with a seal from side wall 7 of body 3 which is of gas-permeable design.

A corresponding segment-shaped connection in the area of adsorption zone 6 is disposed opposite, i.e. on other side wall 8 of cylindrical body 3 which is likewise of gas-permeable design. Connected to this connection likewise sealed from side wall 8 is clean gas pipe 9 which contains exhaust fan 10 and leads to chimney 11.

Preliminary filter 12 is provided in polluted gas pipe 5 in order to separate particles harmful for cylindrical body 3. Connected to polluted gas pipe 5 after preliminary filter 12 is cooling air supply pipe 13 which leads to a connection not shown having a of segment form corresponding to cooling zone 14 and sealed from side wall 7 of body 3. A corresponding segment-shaped connection is disposed in the area of cooling zone 14 on other side wall 8 of cylindrical body 3 and sealed from the same. Connected to this connection is cooling air removal pipe 15 which leads to mixing chamber 16. Exhaust fan 17 is provided in cooling air removal pipe 15.

Hot gas supply pipe 18 leads from mixing chamber 16 to a connection (not shown) on side wall 8 of cylindrical body 3 which is formed like the segment of a circle corresponding to desorption zone 19 and sealed from side wall 8. A corresponding segment-shaped connection (not shown) is disposed in the area of desorption zone 19 on other side wall 7 of cylindrical body 3 and sealed from side wall 8. Connected to the connection on side wall 7 in the area of desorption zone 19 is pollutant pipe 20. While cylindrical body 3 rotates, the connections for admitting air to be cleaned and for discharging clean air, for admitting hot air for desorption and for discharging waste air with desorbed pollutants and for passing cooling air are fixed Afterburning plant 2 has two chambers 25, 26 connected via firebox 21 with burner 22 and provided with heat-retaining packing 24 which can be designed in accordance with EP 0 472 605 B1, to which reference is made in all points.

Each chamber 25, 26 is connected via valve 27, 28 with pollutant pipe 20 and via valve 29, 30 with clean gas pipe 31 of afterburning plant 2 which opens after fan 10 into clean gas pipe 9 of adsorptive cleaning plant 1.

A partial stream of firebox air heated to 700 to 900° C. is removed from firebox 21 via firebox air removal pipe 33 and supplied to mixing chamber 16. The ratio of firebox air supplied to mixing chamber 16 via pipe 33 to heated cooling air supplied via cooling air removal pipe 15 is adjusted via control valve 34 in firebox air removal pipe 33.

Between hot air supply pipe 18 and pollutant pipe 20 there is bypass pipe 35 which is connected to pollutant pipe 20 with three-way valve 36. Exhaust fan 37 is disposed in pollutant pipe 20 after three-way valve 36.

The plant works as follows. Waste air loaded with pollutants is supplied via polluted gas pipe 5 to adsorption zone 6 of cylindrical body 3 in which the pollutants are adsorbed. The cleaned waste gas flows via clean gas pipe 9 into chimney 11.

Cylindrical body 3 rotates in accordance with arrow 38 around axle 4 so that the absorbent loaded with pollutants in cylindrical body 3 is rotated from adsorption zone 6 into desorption zone 19, while desorption zone 19 passes into cooling zone 14 and the cooling zone into adsorption zone 6 in order to adsorb pollutants from waste air to be cleaned again.

A partial stream of 5 to 20% of waste air to be cleaned is diverted from polluted gas pipe 5 as cooling air via cooling air removal pipe 15 in order to cool desorption zone 19 just desorbed with hot air from hot air supply pipe 18. After flowing through cooling zone 14 then heated cooling air is urged via cooling air removal pipe 15 with fan 17 into mixing chamber 16, where it is mixed with a small quantity of firebox air heated to 700 to 900° C. via firebox air removal pipe 33, controlled via control valve 34, in a mixture ratio of for example 5 parts by weight cooling air to 1 part by weight hot firebox air, into hot air which is supplied via hot air supply pipe 18 to desorption zone 19 in order to expel pollutants therefrom. That is, according to the invention the portion of cooling air is many times, for example five times, greater than the portion of hot air, thereby obtaining perfect cooling. This ensures that the ratio of hot air to cooling air does not exceed 1.0 to 1.5, in particular 1.1 to 1.33. At the same time, only a small portion of firebox air of e.g. ⅙ of the supplied cooling air is supplied to mixing chamber 16, thereby preventing overloading with water vapor and thus a danger of corrosion and impairment of the adsorptive power of adsorbent in cylindrical body 3.

Waste gas loaded with a high pollutant concentration due to the desorption passes in pollutant pipe 20 with fan 37 via valves 27, 28 into one of the two chambers 25, 26 of afterburning plant 2. Heat-retaining packing 24 in particular chamber 25, 26, which was heated in the previous cycle, heats the waste gas containing desorbed pollutants, whereupon the desorbed pollutants are burned in firebox 21. While e.g. 1 part of the firebox air is diverted via firebox air removal pipe 33, the remaining e.g. four parts of hot firebox air heat heat-retaining packing 25 in other chamber 26, 25, so that largely cooled clean gas with a temperature of less than 100° C. passes into clean gas pipe 31

Chambers 25, 26 are charged with waste air with desorbed pollutants alternately e.g. every 1 to 3 minutes by a switchover of valves 27, 28 in pollutant pipe 20 and valves 29, 30 in clean gas pipe 31. The high mixture ratio of cooling air to firebox air avoids substantial accumulation of moisture in the circuit between afterburning plant 2 and adsorptive cleaning plant 1.

In order to prevent waste gas with desorbed pollutants contained in chamber 25, 26 last charged with waste gas with desorbed pollutants via pipe 20 from passing from said chamber 25, 26 into clean gas pipe 31 after switchover, hot air little loaded with pollutants is supplied shortly before the beginning of switchover of valves 27 and 28 in pollutant pipe 20 and valves 29, 30 in clean gas pipe 31 by means of three-way valve 36 for a few seconds to particular chamber 25, 26 via bypass pipe 35. Directly thereafter bypass pipe 35 is closed again with three-way valve 36 so that hot air in hot air supply pipe 18 is supplied back to desorption zone 19.

Thermal afterburning thus reaches a mean degree of cleaning of over 99.5%.

Figure 2:
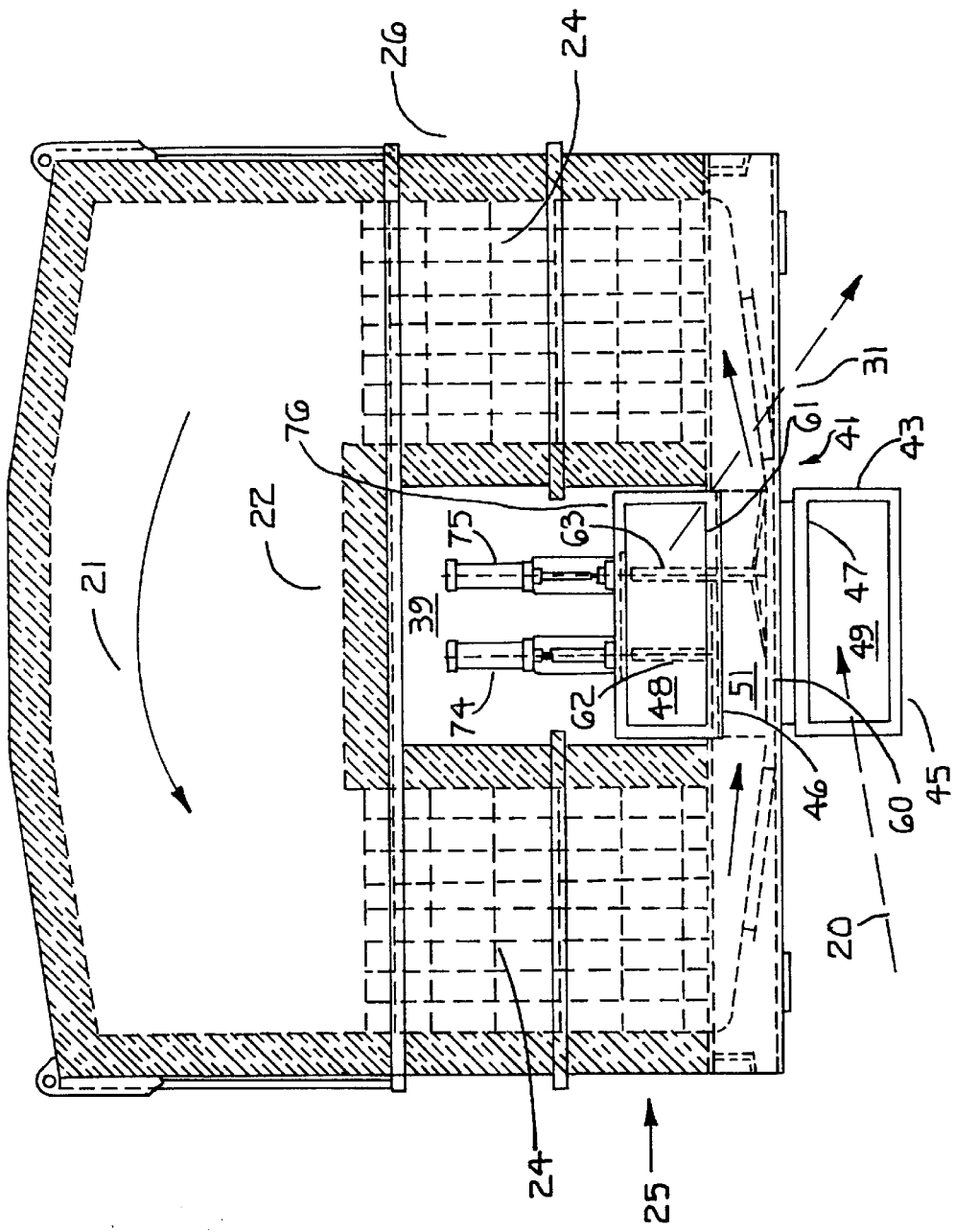
FIG. 2 shows a cross section through the afterburning plant.
Figure 3:
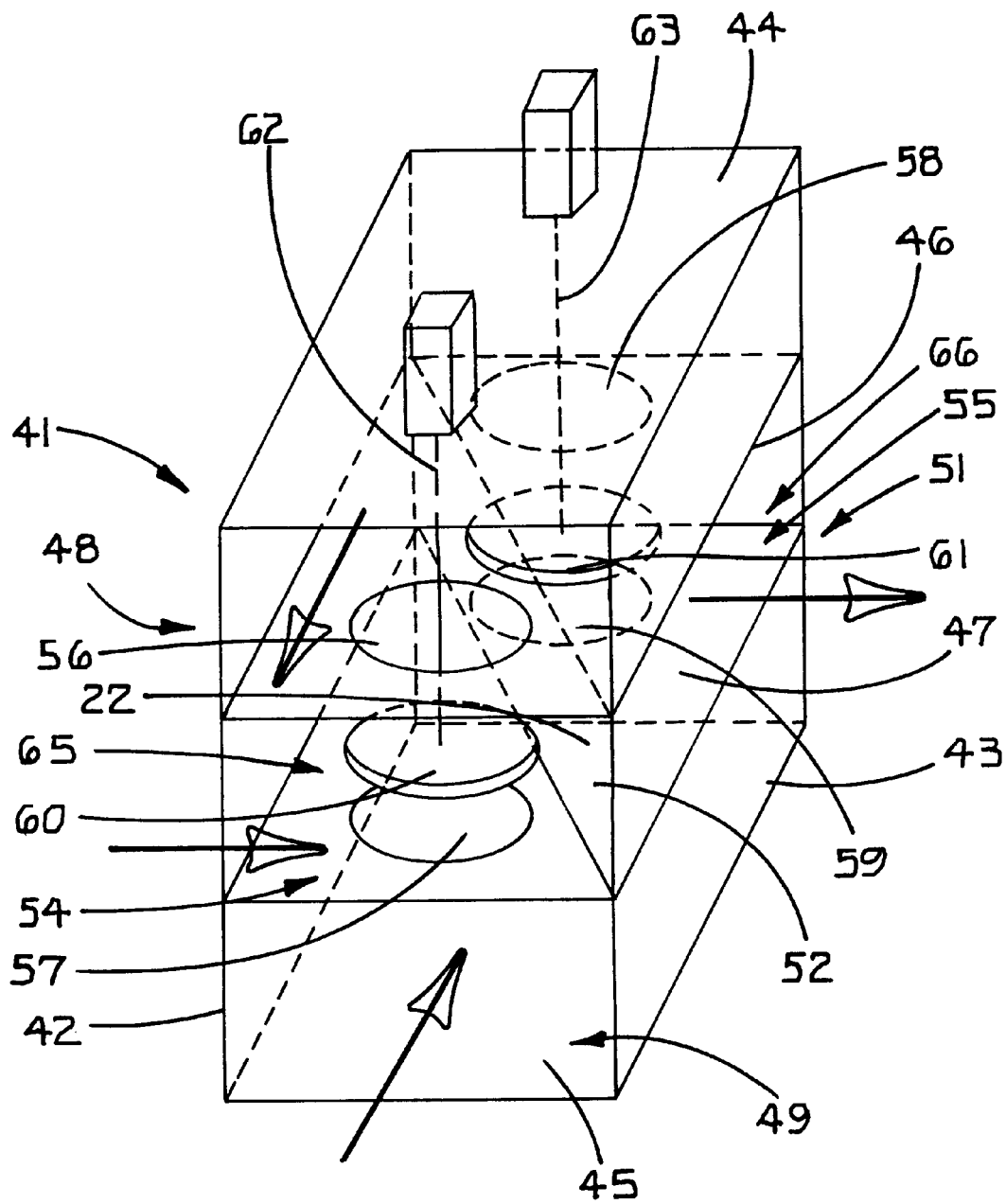
FIG. 3 shows schematically the main shut-off device of the afterburning plant in a perspective view with the side wall removed from the gas removal channel and the end wall removed from the housing of the main shut-off device.

In the afterburning plant of FIGS. 2 and 3, which is designed according to German patent application 196 43 821.7, valves 27, 28 and 29, 30 are provided in box 41 disposed in space 39 between two chambers 25, 26. Box 41 has two side walls 42, 43, upper wall 44, lower wall 45, upper partition 46 and lower partition 47. Upper wall 44 and upper partition 46 enclose with side walls 42, 43 gas removal channel 48 to which clean gas pipe 31 is connected, while lower wall 45 and lower partition 47 enclose together with side walls 42, 43 gas supply channel 49 to which pollutant pipe 20 is connected. Channels 48 and 49 are sealed at the ends at the back in FIGS. 2 and 3. Upper partition 46 and lower partition 47 form together with side walls 42, 43 the housing of shut-off device 51 of the plant. In this housing vertical partition 52 is provided between upper wall 46 and lower wall 47, separating the housing into two single chambers 54, 55.

Single chambers 44, 45 are provided on upper housing wall 47 and lower housing wall 48 with openings 56, 58; 57, 59 in each case. For opening and closing the two openings 56, 57; 58, 59 disposed one on the other, each single chamber 54, 55 has plate-shaped closing body 60, 61 which is fastened to the lower end of piston rod of 62, 63.

Single chambers 54, 55 of shut-off device 51 are connected with one firebox 25 or with other firebox 26. For this purpose shut-off device 51 is designed to be open in the area of particular single chambers 54, 55 on the side facing particular chamber 25, 26, i.e. side wall 42 or 43 is lacking in this area. This results in large opening 65, 66 through which waste air with desorbed pollutants flows into particular chamber 25, 26 or clean gas from particular chamber 25, 26 into main shut-off device 51.

Piston rods 62, 63 are operated in each case by piston/cylinder unit 74, 75 fastened to holding device 76 above box 41 in space 39. In the end positions of piston rods 62, 63 and thus of plate-shaped closing bodies 60, 61, one of two openings 56, 57 or 58, 59 disposed one on the other in each single chamber 54, 55 is thus closed in each case while other opening 57, 56 or 59, 58 is open.

We claim:

1. A method for cleaning waste air loaded with organic pollutants with an adsorptive cleaning plant having at least one cylindrical body which contains an adsorbent and has sector-shaped connections located opposite on each side disposed rotatably about the cylinder axis relative to the cylindrical body for admitting waste air to be cleaned and for discharging clean air after adsorption of pollutants, for admitting hot air for desorption of adsorbed pollutants and for discharging waste air with adsorbed pollutants and for passing cooling air, and an afterburning plant having a firebox which is supplied waste air with desorbed pollutants, the hot air being formed by mixture of air produced in the firebox with the heated cooling air passing out of the cylindrical body, characterized in that the afterburning plant used is a plant having two chambers connected via the firebox and filled with a heat-retaining packing, waste air with desorbed pollutants being supplied alternatingly to one chamber and clean air removed from the other chamber, a part of the firebox air heated to 700 to 900° C. being used with cooling air passing out of the cylindrical body to form the hot air for desorption.

2. The method of claim 1, characterized in that the throughput of waste air with desorbed pollutants in the afterburning plant is 5 to 20 wt % of the throughput of waste air to be cleaned through the cylindrical body.

3. The method of claim 1, characterized in that the mixture ratio of firebox air heated to 700 to 900° C. to heated cooling air to form the hot air is 3 to 10 parts by weight cooling air per part by weight firebox air, so that the ratio of hot air to cooling air does not exceed 1.0 to 1.5.

4. The method of claim 1, characterized in that the chamber of the afterburning plant which was last supplied waste air with desorbed pollutants is supplied cooling air before clean air is removed therefrom.

5. The method of claim 4, characterized in that the cooling air supply lasts no longer than 5 seconds.

6. The method of claim 1, characterized in that hydrophobic zeolites are used as the adsorbent.

7. The method of claim 1, characterized in that a mixture of zeolite and active carbon is used as the adsorbent.

8. A plant with an adsorptive cleaning plant having at least one cylindrical body which contains an adsorbent and has segment-shaped connections located opposite on each side disposed rotatably about the cylinder axis relative to the cylindrical body for passing waste air to be cleaned from a polluted gas pipe into a clean gas pipe, from a cooling air supply pipe connected to the polluted gas pipe into a cooling air removal pipe connected to a mixing chamber and from a hot gas supply pipe connected to the mixing chamber into a pollutant pipe which leads to an afterburning plant with a firebox, characterized in that the afterburning plant (3) has two chambers (25, 26) connected via the firebox (21) and filled with a heat-retaining packing (24), each chamber (25, 26) being adapted to be connected with the pollutant pipe (20) and a clean gas pipe (31), and a firebox air removal pipe (33) being connected to the firebox (21) for supplying firebox air to the mixing chamber (16).

9. The plant of claim 8, characterized in that a control valve (34) is provided in the firebox air removal pipe (33).

10. The plant of claim 8, characterized in that the two chambers (25, 26) of the afterburning plant (2) are spaced apart by a space (39) and disposed in the space (39) is a main shut-off device (51) having a housing with an upper wall (46), a lower wall (47) and a partition (52) between the upper and lower walls (46, 47) which divides the shut-off device (51) into two single chambers (54, 55), each single chamber (54, 55) being provided with a closable opening (56, 57; 58, 59) in the upper wall (46) and the lower wall (47), a control unit (74, 75) being provided for operating a closing body (60, 61) for opening and closing the two closable openings (56, 57; 58, 59) disposed one on the other in each single chamber (54, 55), one single chamber (54, 55) being connected with one chamber (25, 26) of the afterburning plant (2) and the other single chamber (55, 54) with the other chamber (26, 25) thereof, and the pollutant pipe (20) leading to one closable opening (56, 57; 58, 59) of each single chamber (54, 55) and the clean gas pipe (31) to the other opening thereof.

11. The plant of any of claim 8, characterized in that the heat-retaining packing (24) is formed by honeycomb bodies.

12. The plant of any of claim 8, characterized in that the heat-retaining packing (24) or a part thereof is formed as a catalytically active mass.

13. The plant of claim 8, characterized in that the hot gas supply pipe (18) is connected with the pollutant pipe (20) via a bypass pipe (35), and a shut-off device (36) is provided for blocking the pollutant pipe (20) and for supplying hot gas from the hot gas supply pipe (18) to the afterburning plant (2).

14. The plant of claim 13, characterized in that the pollutant pipe (20) has an exhaust fan (37) after the shut-off device (36).

15. The plant of any of claim 8, characterized in that an exhaust fan (17) is provided in the cooling air removal pipe (15).

16. The plant of any of claim 8, characterized in that an exhaust fan (10) is provided in the clean gas pipe (9).

* * * * *